United States Patent

Shieber et al.

[19]

[11] Patent Number: 6,138,098

[45] Date of Patent: *Oct. 24, 2000

[54] COMMAND PARSING AND REWRITE SYSTEM

[75] Inventors: Stuart M. Shieber; John Armstrong, both of Cambridge; Rafael Jose Baptista, Arlington, all of Mass.; Bryan A. Bentz, Stonington, Conn.; William F. Ganong, III, Brookline; Donald Bryant Selesky, Westford, both of Mass.

[73] Assignee: Lernout & Hauspie Speech Products N.V., Ypres, Belgium

[*] Notice: This patent issued on a continued prosecution application filed under 37 CFR 1.53(d), and is subject to the twenty year patent term provisions of 35 U.S.C. 154(a)(2).

[21] Appl. No.: 08/885,631

[22] Filed: Jun. 30, 1997

[51] Int. Cl.[7] .............................. G10L 15/18; G10L 15/22
[52] U.S. Cl. ............................................ 704/257; 704/275
[58] Field of Search .................................. 704/8, 9, 257, 704/270, 275; 395/703, 705, 707, 709, 708

[56] References Cited

U.S. PATENT DOCUMENTS

| | | | |
|---|---|---|---|
| 4,829,423 | 5/1989 | Tennant et al. | 704/8 |
| 4,984,178 | 1/1991 | Hemphill et al. | 704/255 |
| 5,349,526 | 9/1994 | Potts, Sr. et al. | 364/419.1 |
| 5,475,588 | 12/1995 | Schabes et al. | 704/9 |
| 5,640,576 | 6/1997 | Kobayashi et al. | 395/759 |
| 5,805,775 | 9/1998 | Eberman et al. | 704/257 |
| 5,819,210 | 10/1998 | Maxwell, III et al. | 704/9 |
| 5,835,893 | 11/1998 | Usioda | 704/9 |

FOREIGN PATENT DOCUMENTS 0 394 628   2/1990   European Pat. Off. .

OTHER PUBLICATIONS

Parr, Terence J., "An Overview of Sorcerer: A Simple Tree–Parser Generator", Int'l Conference on Compiler Construction; Edinburg, Scotland; Apr. 1994.

Unknown Author, The Free Compiler list –BNF Subset: "Description of Sorcerer: A Simple Tree Parser Generator", Web Document http://archive.inesc.pt/free–dir/free–S–1.300.html Posting date (estimated): May 16, 1994.

Roe, David B., et al, "A Spoken Language Translator for Restricted–Domain Context–Free Languages", *Speech Communication II*, (1992), pp. 311–319.

Wellekens, C. J., et al, "Decodage Acoustique et Analyse Linguistique en Reconnaissance De La Parole", *E Revenue HF*, vol. 13, No. 5 (1985).

Zue, Victor, et al, "The Voyager Speech Understanding System: Preliminary Development and Evaluation", *IEEE*, (1990), pp. 73–76.

*Primary Examiner*—Richemond Dorvil
*Assistant Examiner*—Martin Lerner
*Attorney, Agent, or Firm*—Bromberg & Sunstein LLP

[57] ABSTRACT

A system and method of allowing a user to control a computer application with spoken commands, include the steps of processing the spoken commands with a Speech Recognition application into candidate word phrases, and parsing at least one candidate word phrase with a Context Free Grammar (CFG) parser, into a parse tree. A plurality of predefined rewrite rules grouped into a plurality of phases applied are to the parse tree, for rewriting the parse tree. Each of the plurality of rewrite rules includes a pattern matching portion, for matching at least a part of the parse tree, and a rewrite component, for rewriting the matched part. A command string is produced by traversing each terminal node of the modified parse tree. The command string is sent to an interpreter application or directly to the computer application. Possible applications include word processing and other voice-entry systems.

23 Claims, 14 Drawing Sheets

CFG PARSE TREE OUTPUT

OUTPUT OF
PHASE 1

OUTPUT OF
PHASE 2

OUTPUT OF PHASE 3

OUTPUT OF PHASE 4

OUTPUT OF PHASE 5

FIG. 14 WALKING NODES

COMMAND PARSING AND REWRITE SYSTEM

BACKGROUND

Speech recognition systems are becoming more prevalent, due to improved techniques combined with a great need for such systems. Speech recognition systems (SRS) and Applications (SRAs) are used in a wide range of applications including free speech entry (Continuous Speech Recognition) into word processing systems, speech selected items for limited choice entry categories, such as form completion, and verbal commands for controlling systems.

In the area of verbal commands for controlling systems, a goal is to allow near-normal human speech to be comprehendible by a computer system. This field is referred to as Natural Language Processing (NLP), an area where humans excel but that is incredibly difficult to define in precise mathematical terms needed for computational processing.

In free speech entry systems, such as word entry into a word processing program, a person speaks, and the SRS system inserts the words into the word processing program. The person watches the words being entered by a visual system, such as a computer monitor. There is direct feedback to the user, who can see her thoughts recorded, and make corrections should the SRS system misunderstand a word or phrase. Compared to a person using a tape recorder to later have a stenographer transcribe it, this SRS has many advantages.

This direct feedback loop is even more advantageous since the person can also edit the text entered into the word processor. Writing is an indefinite process, often requiring changes and restructuring. Editing and redrafting is an integral part of writing. If a person is entering text into a word processor using a SRS system, it is a natural extension for the person to be able to edit and modify the text using voice commands, instead of having to resort to keyboard entry or pointer devices. Therefore, an SRS system for text entry would preferably have at least two different modes, one of free speech entry, and one of user command interpretations. These modes are very different processes, but their combination has great utility.

There are a great variety of word processing programs available which run on general purpose computers such as personal computers (PCs). There are also several SRA (Speech Recognition Applications) available, some of which allow a user to enter text into a word processing application. The word processing application is separate from the SRA. The word processing application normally accepts text from a keyboard, though the text entry can take other forms. The SRA acts as a "front end" to the user's word processing application.

As previously described, adding text into a word processing application and allowing speech command editing are two different concepts. To allow editing, an SRA must be able to interpret user commands, and instruct the separate word processing application to perform those commands. Interpreting user commands represents a vast range of problems, from the difficult task of NLP (Natural Language Processing), to the problem of properly instructing a variety of different user applications.

A NLP system for controlling a word processing application will usually have a limited vocabulary recognition determined by the available commands for editing and formatting text. The NLP system must be able to interpret the variety of commands and instruct the word processing application to perform accordingly. The set of possible commands can be very large. As an example, some commands limited to VERB-NOUN pairs (in action-object paradigms) include "delete character", "delete word", "delete line", "delete sentence", etc. With a huge number of possible noun objects, a mapping of all possible verb actions (examples: "delete" "italicize", "underline", "bold", "move" etc) is enormous. Further, any additions in the form of new commands will create a huge number of new VERB-NOUN pairs.

Another problem is that NLP is often error prone. Many SRAs often rely on educated guesses as to the individual words the user said. A typical SRA has no thematic or semantic sense of natural language. It only attempts to identify words based on analysis of the input sound sampling. This leads to several possible interpretations of what the user requested. The NLP application has the daunting task of attempting to interpret several possible commands and selecting the correct interpretation. Computer processing time is wasted on improper determinations, resulting in overall slow application speed. Further, an NLP application often cannot even determine an incorrect determination.

Some systems allowing user commands attempt to avoid these problems by using "fill in the blank" templates. The user is prompted with a template to complete, by first stating a verb, and then stating an object. The choice of possible entries into each slot of the template is severely limited. The user can only enter a limited selection of verbs or nouns.

This approach severely limits the power of an NLP system. This template approach is slow and user intensive. Also, modifiers are not allowed, so a user cannot say "delete two words". The user must issue two "delete word" commands. The goal of making application command interpretation an easy and intuitive task becomes lost.

Accordingly, what is needed is a NLP system which can accurately interpret a wide range of user commands, with easy extensibility. The word vocabulary and command forms must be easy to extend, without affecting the present vocabulary. Further, improper command phrases should be detected as quickly as possible to avoid spending computer time processing such phrases. The system should also provide users with informative error messages when command phrases are improper. The NLP application must be immune from infinite loops occurring while processing commands.

The NLP command interpreting application must be modular enough so that adapting it to command different applications is simple. For example, the NLP application should require minimal changes to allow commanding of different word processing applications, each with a completely different programming or macro language. Adapting the NLP application to other application domains, including mail systems, spreadsheet programs, database systems, games and communication systems should be simple.

Along with the NLP command interpreter being adaptable among different applications at the back end, it should also be adaptable at the front end, for different languages such as English or French, or to allow for other variations in speech or dialect.

SUMMARY

The present invention includes a system for converting a parse tree representing a word phrase into a command string for causing a computer application to perform actions as directed by said word phrase. A rewriting component applies at least one of a plurality of predefined rewrite rules to the parse tree, for rewriting the parse tree according to the rewrite rules.

The predefined rewrite rules are divided and grouped into a plurality of phases. The rewriting component applies all predefined rewrite rules grouped into one of the plurality of phases to the parse tree before applying predefined rewrite rules grouped into another of the plurality of phases. Within each phase, the rewrite rules are applied in a predefined sequence to the parse tree. Each of the rewrite rules includes a pattern matching portion, for matching at least a part of the parse tree, and a rewriting portion, for rewriting the matched part of the parse tree. The rewriter component applies the rewrite rule to the parse tree by comparing the rewrite rule pattern matching portion to at least a part of the parse tree. If the predefined rewrite rule pattern matching portion matches at least a part of said parse tree, the matched part of the parse tree is rewritten according to the predefined rewrite rule rewriting portion.

The parse tree is produced by a parser, in the preferred embodiment a CFG (Context Free Grammar) parser in response to the word phrase. The CFG parser includes a predefined plurality of CFG (Context Free Grammar) rules, and the CFG parser applies at least one of the predefined plurality of CFG rules to the word phrase, to produce the parse tree. The word phrase is produced by a Speech Recognition Application in response to a user speaking the word phrase.

The command string produced includes programming language instructions, which are interpreted by an interpreting application which causes the computer application to perform actions as directed by the word phrase. Alternatively, the programming language instructions are interpreted by the computer application to cause it to perform actions as directed by the word phrase. An example computer application is a word processing application.

A method of allowing a user to control a computer application with spoken commands according to the present invention includes the steps of converting a spoken command into electrical signals representing the spoken command. The electrical signals are processed with a Speech Recognition application into at least one candidate word phrase. The at least one candidate word phrase is parsed with a Context Free Grammar (CFG) parser into a parse tree. A plurality of predefined rewrite rules grouped into a plurality of phases are applied to the parse tree, for rewriting the parse tree into at least one modified parse tree.

Each of the plurality of predefined rewrite rules includes a pattern matching portion, for matching at least a part of the parse tree, and also includes a rewrite component, for rewriting the matched part of the parse tree.

The method includes producing a command string by traversing nodes of the at least one modified parse tree, and providing the command string to an interpreter application. The interpreter application is directed to execute the command string, for causing the interpreter application to instruct the computer application to perform actions appropriate for the spoken command.

If the predefined rewrite rule pattern tree component matches at least a part of the parse tree, the matched part of the parse tree is rewritten according to the predefined rewrite rule rewriting portion. If the matched part of the parse tree includes subnodes not matched by the predefined rewrite rule pattern tree component, the predefined rewrite rules grouped in one of the plurality of phases are sequentially applied to the unmatched subnodes of the parse tree. Each of the phases includes an implicit predefined rewrite rule which matches and rewrites one node of the parse tree, the implicit predefined rewrite rule being applied to the parse tree if no other predefined rewrite rules grouped in each of the phases match the parse tree.

DETAILED DESCRIPTION

Figure 1:
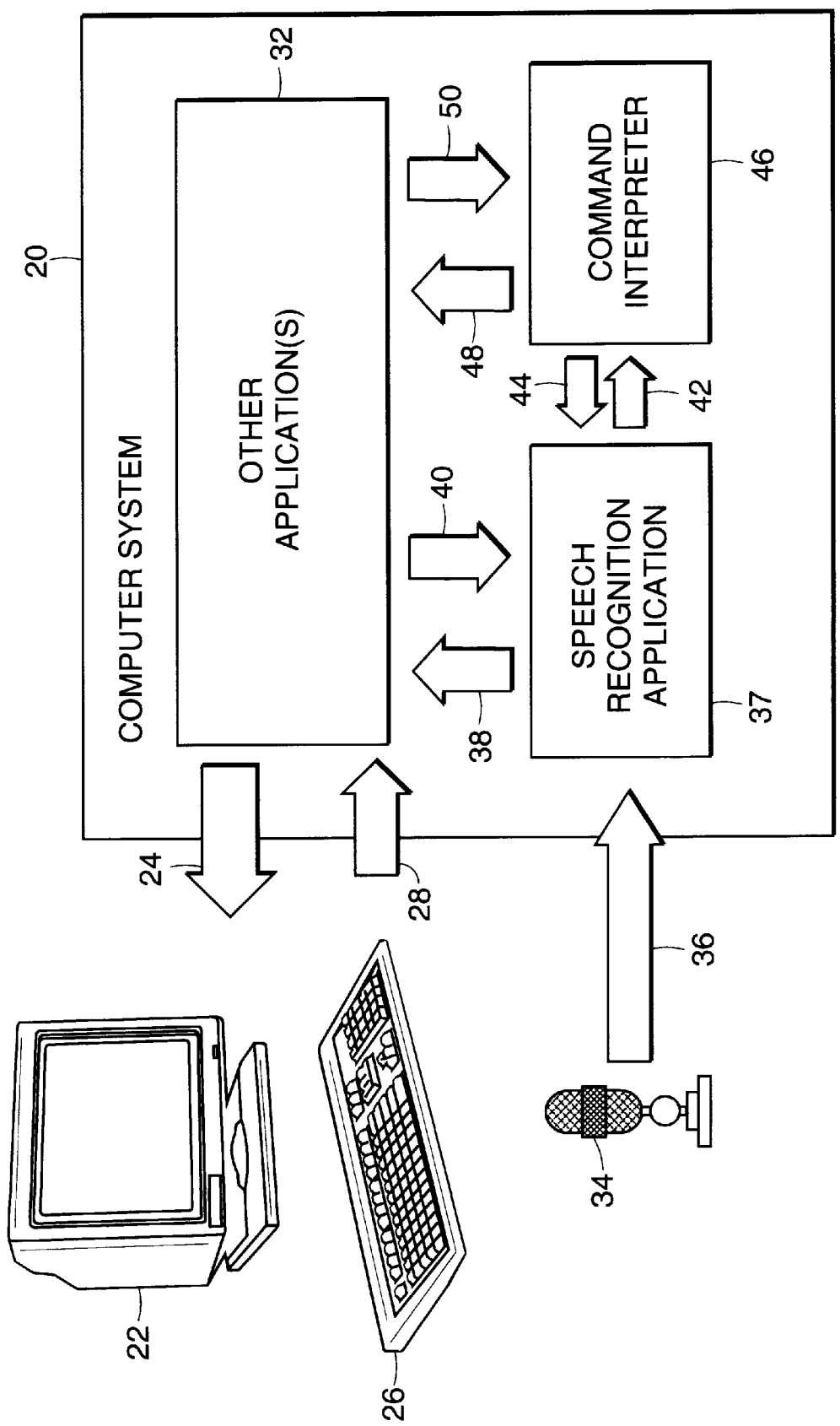
FIG. 1 is an overview of a computer system including a speech recognition application and command interpreting system to control another application according to the present invention.

A general purpose computing system 20 which includes speech recognition and speech control of applications is shown in FIG. 1. The computer system 20 is any general purpose computer, including workstations, personal computers, laptops, and personal information managers. In a typical arrangement, the computing system 20 displays output 24 on a computer monitor 22, for a user to see. The user can type input on keyboard 26, which is input into computer system 20 as shown by arrow 28. Other user display and input devices are also available, including display pointers such as a mouse etc. (not shown).

At least one application 32 is running on computer system 20, which the user normally can monitor and control using monitor 22 and keyboard 26. Application 32 is any computer application which can run on a computer system, including operating systems, application specific software, etc. Besides displaying output, applications can also control databases, perform real-time control of robotics, and perform communications etc. For this description, a word processing application will be used for exemplary purposes. However, there is no limit on the type of applications and systems controllable by the present invention.

For entering words and commands to an application 32, a user speaks into a microphone 34. Microphone 34 includes headset microphones and any other apparatus for converting sound into corresponding electrical signals. The electrical signals are input into SRA (Speech Recognition Application) 37, as shown by arrow 36. The electrical signals are typically converted into a format as necessary for analysis by SRA 37. This includes conversion by a real-time A/D converter (not shown), which converts the analog electrical signals into discrete sampled data points represented as digital quantities. The digital data can also be preprocessed using various signal processing and filtering techniques, as is well known in the art.

SRA 37 is a speech recognition system which converts the input data into candidate words and word phrases. SRA 37 includes Continuous Speech Recognizers (CSR) and other varieties of discrete speech recognizers. An example SRA 37 is Voicepad, as produced by Kurzweil Applied Intelligence Inc., of Waltham, Mass. Voicepad runs on a variety of platforms including Microsoft® Windows Systems including Windows 3.1, NT and Windows 95.

SRA 37 is capable of controlling application 32 using standard interface methods 32 including IPC (inter-process communication) such as OLE (Object Linking and Embedding), sockets, DDE, and many other techniques. SRA 37 is also able to monitor and obtain information 40 about application 32 using the same techniques. For the example of word processing, SRA 37 inserts the words spoken by the user into the word processing buffer of application 32. The user can use the keyboard 26 or microphone 34 interchangeably to enter text into the word processing application 32.

Either separate or combined with SRA 37 is command interpreter 46. SRA 37 can communicate fully with command interpreter 46 as shown by arrows 42, 44. Command interpreter 46 receives candidate words or word phrases from SRA 37, which command interpreter 46 then processes into instructions 48 for application 32. These instructions can be any form as needed for controlling application 32, including macros, interpreted code, object code and other methods as will be discussed below. Command interpreter 46 can also monitor application 32 as shown by arrow 50.

In the example of word processing applications, a user speaks text to be entered into the word processor, which is processed by SRA 37 and sent to application 32. The user can also speak editing and formatting commands, which are processed by SRA 37 and command interpreter 46, and then sent to application 32. Some example editing commands includes "delete word", "move up one page", "bold this word", etc. The user never has to use the keyboard 26, although they are always free to do so. SRA 37 can distinguish text from editing commands using several techniques, one of which is described in U.S. Pat. No. 5,231,670, assigned to Kurzweil Applied Intelligence Inc., and incorporated herein by reference.

Figure 2:
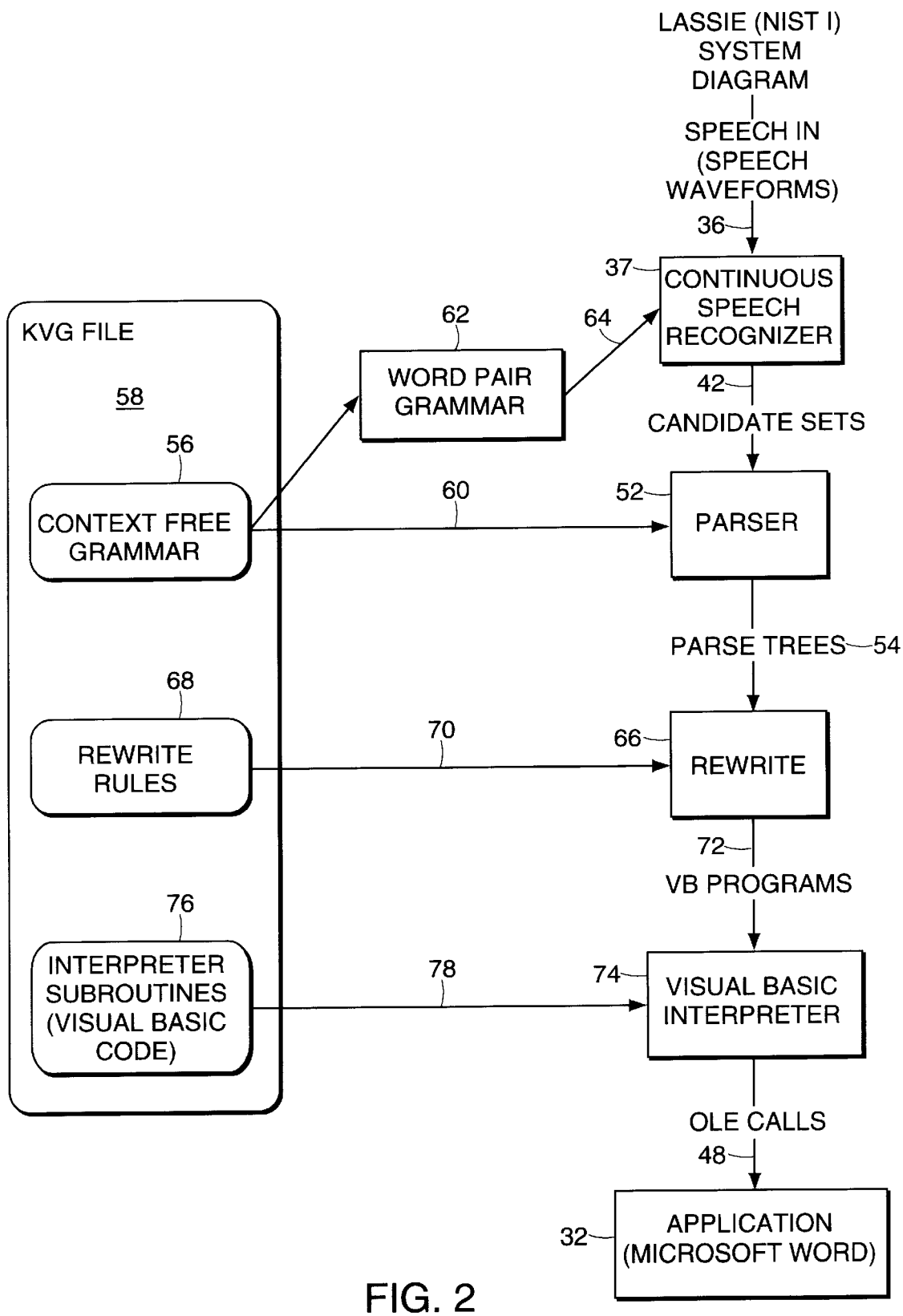
FIG. 2 is a block diagram including elements of a command interpreting and rewrite system.

Command interpreter 46, FIG. 2 receives input 42 from SRA 37 preferably in the form of candidate sets of possible words. As previously stated, word ambiguity and speech misinterpretation often results in several possible different word phrases which must be analyzed. An SRA 37 can receive information to assist in identifying possible valid word phrases in the form of word pair grammar rules 62. These word pair grammars are available from grammar files 56. By using the word pair grammars, SRA 37 has information to help interpret spoken words and provide educated guesses as to word phrases spoken by the user.

Candidate sets 42 are input into Context Free Grammar (CFG) parser 52. CFG parser 52 accepts input 60 from grammar file 56. The input 60 includes grammar rules for parsing a language. Context free grammars (CFGs) are a standard way to represent the syntactic structure of formal languages. Highly regular sets of English sentences, such as command sets, can also be expressed using these grammars. In a context free grammar, each word in the language is of a particular type, say a noun, verb or adjective. Sequences of these types can in turn be represented by other types. Context Free Grammar Parsers will be discussed in greater detail below.

The output of CFG Parser 52 is a parse tree 54 representing the word phrase 42 which was input to CFG parser 52. If several possible word phrase candidates 42 are input into CFG parser 52, a separate parse tree 54 will be produced for each word phrase candidate 42.

The parse tree 54 is then examined by rewriter 66. Rewriter 66 also gets input 70 from a file 68 which contains rewrite rules used by rewriter 66 in rewriting parse tree 54. CFG parser 52, rewriter 66, and database files 58 comprise the main components of command interpreter 46, FIG. 1.

The output of rewriter 66 is a command string 72 which instructs application 32 how to perform the commands spoken by the user. Command string 72 may be a set of instructions to be interpreted by an interpreter 74. Interpreter 74 may access or be automatically loaded with libraries of routines and code 76, which are available 78 to assist in controlling and monitoring application 32. Alternatively, command string 72 may be compiled by a compiler into object code, as is well known in the art. Further, depending on the application 32, command string 72 may be sent directly to the application 32 to be executed.

If an intermediary interpreter 74 is used, the output of interpreter 74 includes set of interprocess communication calls 48 for controlling application 32.

Figure 3:
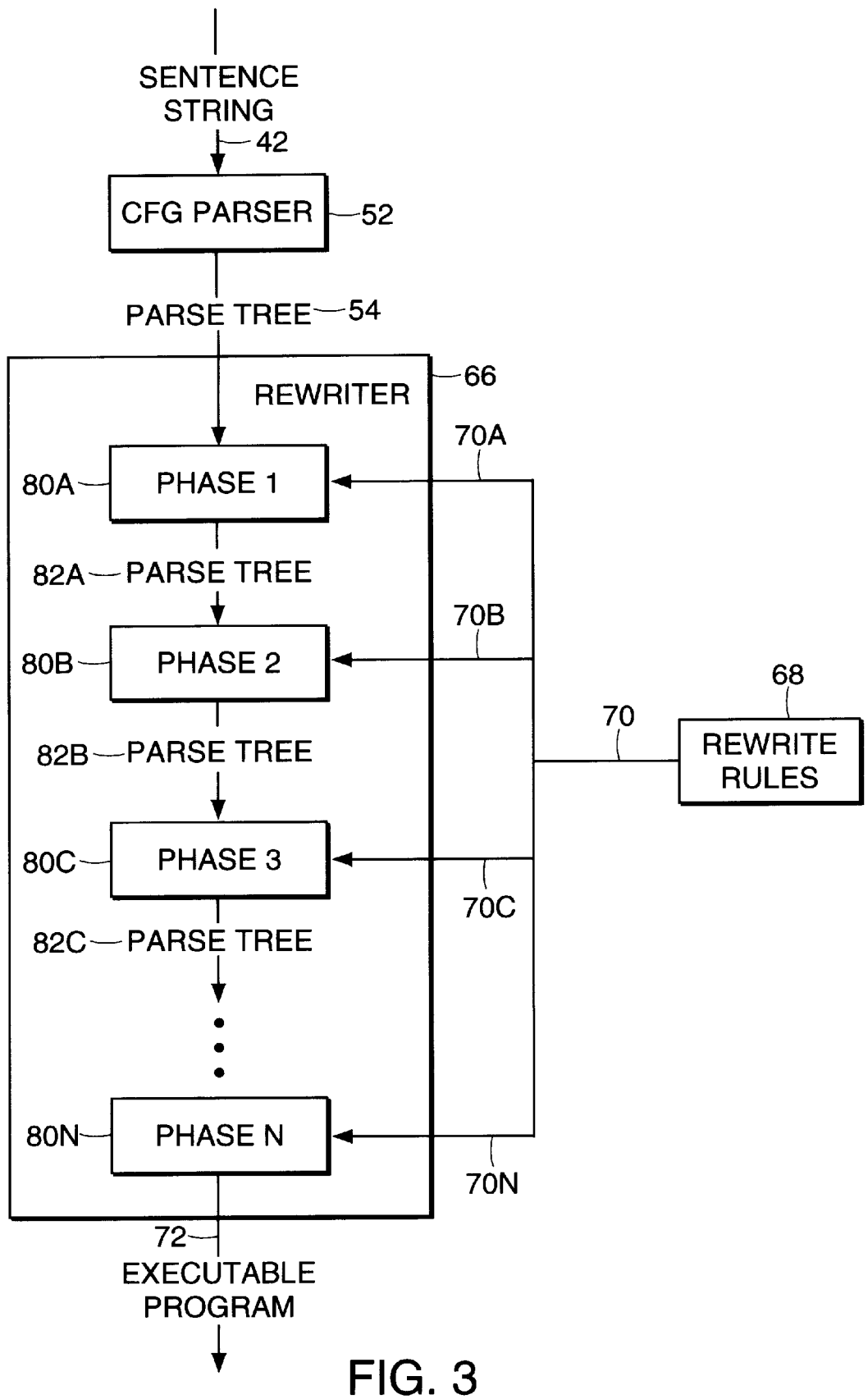
FIG. 3 is block diagram focusing on a rewrite system according to the present invention.

CFG parser 52, FIG. 3 converts words, word phrases and sentences into a parse tree representing the syntactic form of input words or sentences. A parser takes an input sentence and a grammar to determine the structure of the sentence relative to the given grammar. For example a sequence 'determiner noun' can be represented by another type such as 'noun-phrase'. These relationships can be expressed in an example grammar of:

noun-phrase→det noun
sentence→verb noun-phrase
noun→"ball"
noun→"box"
det→"the"
verb→"kick"

Figure 4:
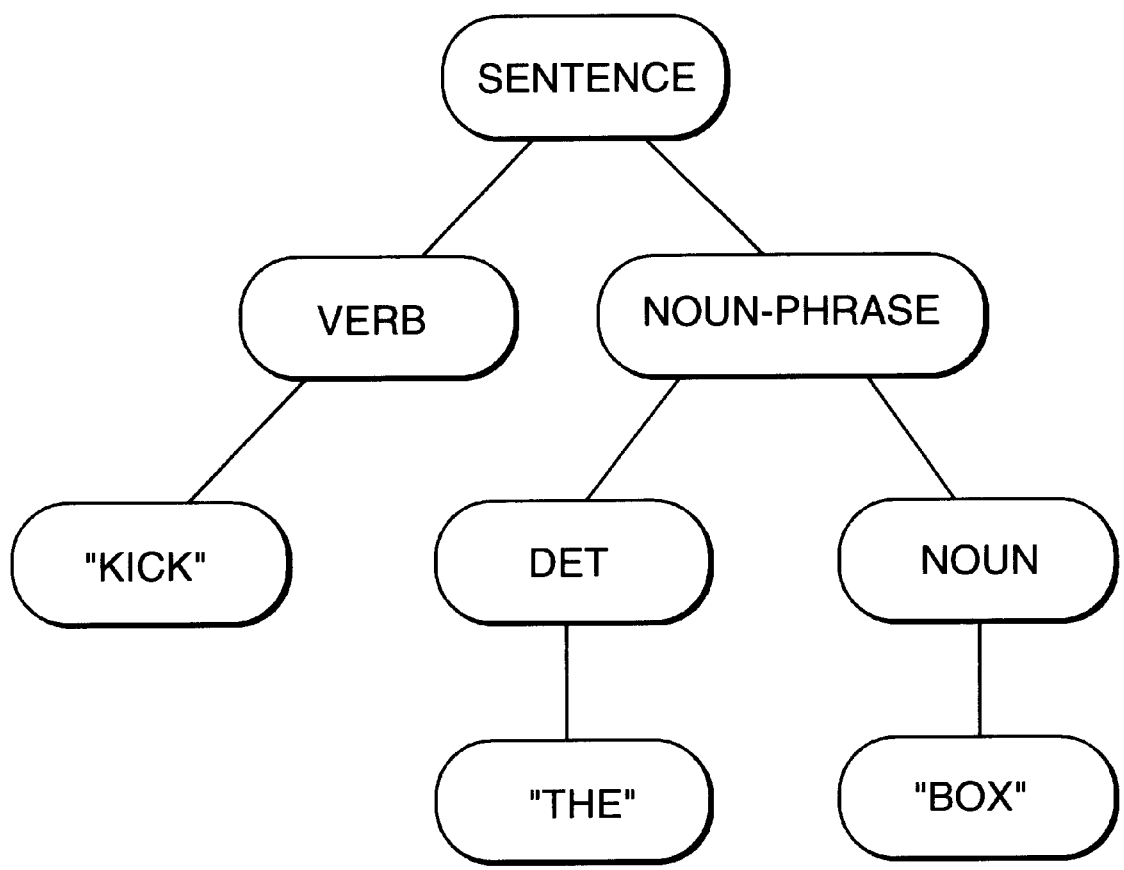
FIG. 4 is an example parse tree produced by a CFG parser.

A grammar is a set of rules that define the structure accepted and parsed by that grammar. A parser using these grammar rules will take an input sentence and determine the structure of the sentence relative to this grammar, if there is one, and can reject sentences for which there is no such structure. The parser matches components on the right side of the grammar to components on the left, usually by recursively scanning the sentence structure, and applying grammar rules which match the sentence. The parsed structure can then be represented as a parse tree. For example, with the sentence "kick the box" and the grammar above, the parse tree as shown in FIG. 4, would be:
sentence(verb("kick"),
  noun-phrase(det("the"), noun("box")))

A parse tree 54 can be represented in any convenient form for processing. Trees are recursive data structures composed of nodes. Any tree is a subtree of itself. Each node can have a set of child nodes. These nodes may in turn have their own children, nodes are divided into two classes, terminal and non-terminal nodes. Terminal nodes in a parse tree typically will represent words in an input sentence, or the words in the output program. These nodes never have any children. All other nodes are non-terminal, which have children. They are typically used to represent the 'phrase structure' of a sentence.

Some standard representations for parse trees include linked nodes using pointers, data structures, arrays, tables, and text lists, such as the above example parse tree.

In the preferred embodiment, CFG parser 52 FIG. 3 is an implementation of the well known parsing algorithm by Jay Earley (J. Earley, 1970, "An efficient context-free parsing algorithm", Comm. ACM ). Alternatively, a shift reduce parser (which is a standard CFG parser implementation typically used in language compilers) is used. The particular parsing technology is not important. Any parser that can parse arbitrary context free grammars will work. The grammars used may include recursion, but preferably they should have only finite ambiguity.

At load time CFG parser 52 is loaded with a Context Free Grammar (CFG) 56 from a file. Any suitable CFG 56 can be used. Typically there will be at least one CFG 56 for each application 32. The CFG 56 describes the set of commands that can be issued to a given application 32. For example to recognize the following small set of commands:
bold this line
bold this word
bold this sentence
delete this line
delete this word
delete this sentence
go to the end of the document
The following Context Free Grammar (CFG) 56 will work:
S→VERB OBJECT
S→"go to the end of the document"
VERB→bold
VERB→delete
OBJECT→"this line"
OBJECT→"this word"
OBJECT→"this sentence"

CFG 56 defines a fixed set of commands that will be recognized against. It also determines the vocabulary size that SRA 37 will recognize. It also constrains the number of commands the recognizer will recognize against. As an example, in one embodiment of the present invention, only sequences composed of pairs of words that are possible in a given CFG are recognized. The set of commands for which command string programs must be generated is clearly determined. In the above example CFG 56, there are seven commands which programs can be generated to perform.

Rewriter 66 takes a parse tree 54 and repeatedly rewrites it. Rewriter 66 comprises of a series of 'phases' 80. Each phase 80 takes a parse tree, transforms it, and passes the output 82 on to the next phase 80. Tree walking the final result produces a command string 72 representing an executable program.

Figure 5:
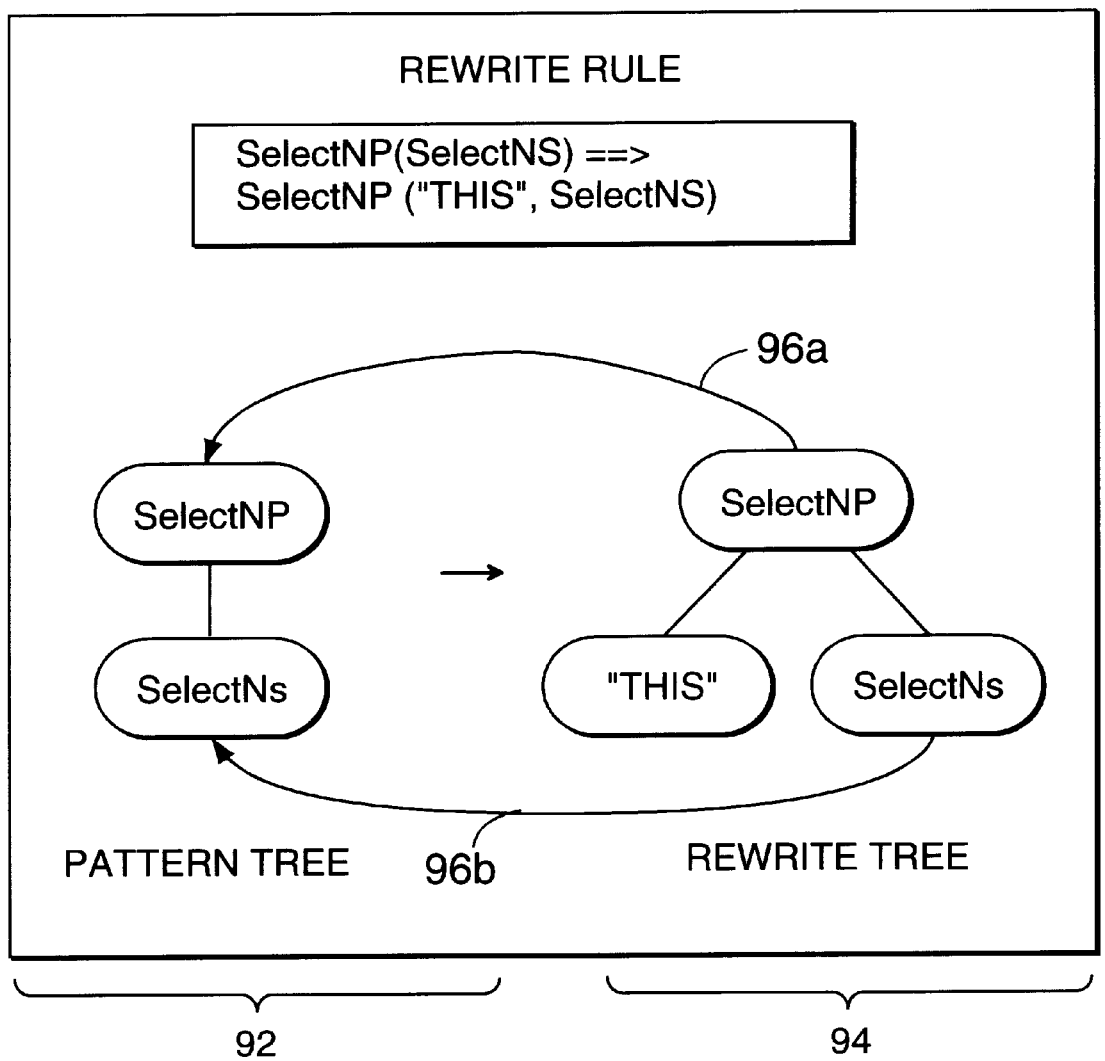
FIG. 5 shows an example rewrite rule.

Each phase 80 applies a set of rewrite rules 68 to the parse tree 54, 82. A rewrite rule 90 FIG. 5, is a pair of trees, similar to parse trees. A rewrite rule 90 includes a pattern tree 92 and a rewrite tree 94.

The pattern tree 92 is used to match against the input parse tree 54. If the input tree 54 matches the pattern tree 92, then the rewrite tree 94 is used as a template to build an output parse tree 82.

Figure 6:
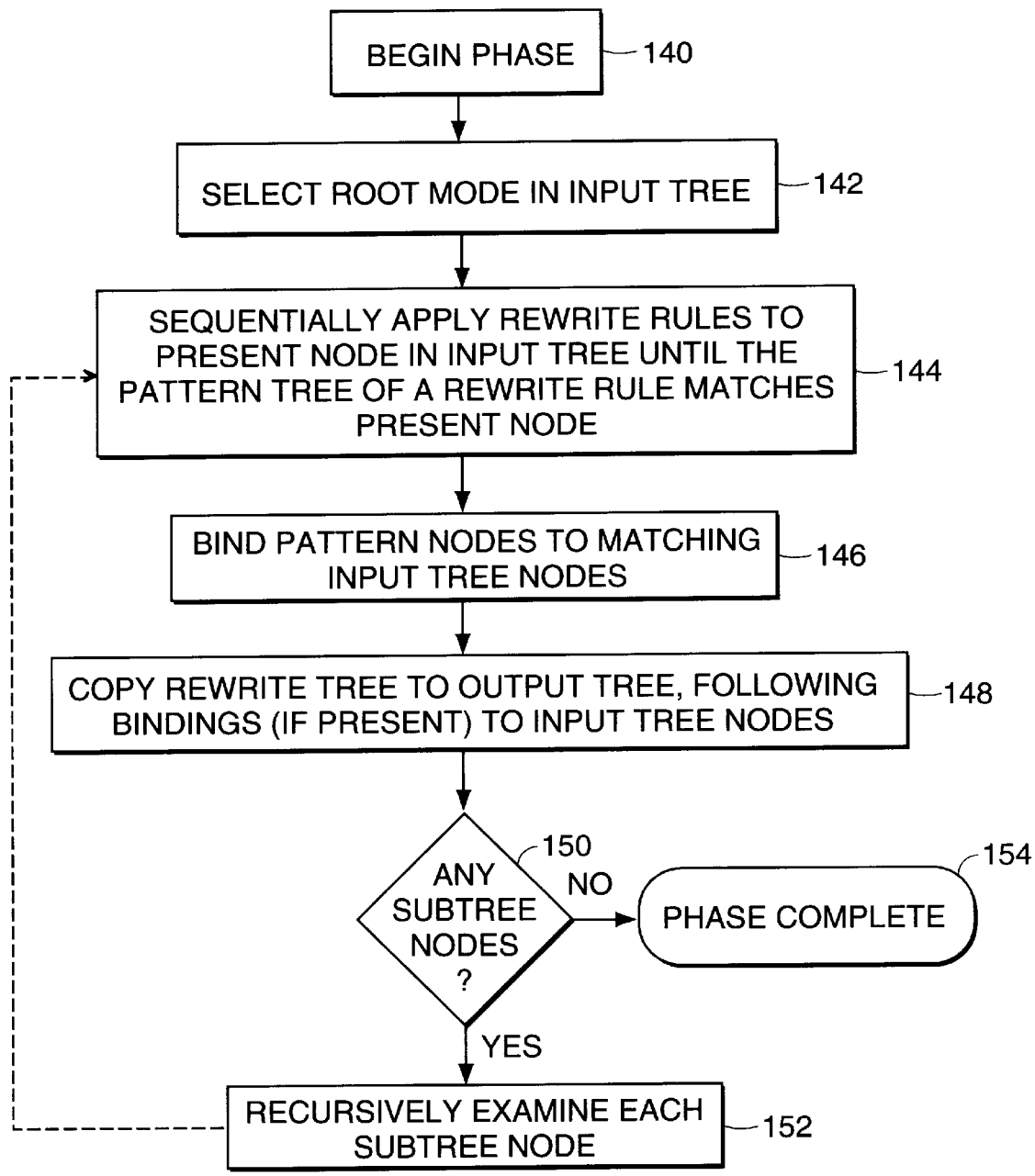
FIG. 6 is a flowchart showing the steps performed in rewriting parse trees according to the present invention.

The steps performed by a rewrite phase 80 begins with the start of a phase, step 140, FIG. 6. The matching starts with the highest node (usually the root node) of the input tree, step 142. The first rewrite rule of the phase is compared to the nodes of the input tree 54. The comparison and matching process will be described below. If the rewrite rule pattern tree does not match the node, the next rule in the phase is applied until a rule matches, step 144.

When a rewrite rule pattern tree 92 matches the input node, the next step is to bind the matching nodes in the pattern tree 92 to the matched nodes in the input tree, step 146. The matched input tree is rewritten by copying nodes following the bindings, step 148.

If there are more subtree nodes on input tree 54 step 150, then the process recurses, step 152. The recursive process starts at step 144 with the subtree nodes as the input nodes. All rewrite rules of the phase are applied to the subtree nodes until a rewrite rule matches. The subtree nodes are bound and rewritten to the output, steps 146–148. This recursive walking of the input tree continues until there are no more subtree nodes, as determined at step 150. The rewrite phase is now complete, step 154.

The steps as described in FIG. 6 will now be described in detail. To match an input tree 54 to a pattern tree 92 for step 144, the root node of each tree 54, 92 is compared. If the two nodes match, the rewriter recursively descends the pattern tree 92, matching the children of each node against the appropriate nodes in the input tree 54. If all of the nodes in the pattern tree 92 are matched against nodes in the input tree 54 then the match is successful. This means that for each node in the pattern tree 92 there will be at least one node in the input tree 54 that the pattern node is "bound" to. It is possible for the input tree 54 to have nodes that are not "bound".

Two nodes match if the two nodes are identical. In addition there are four special pattern tree nodes which can match a certain class of input tree 54 nodes:

The special wildcard node (in the preferred embodiment, this is represented by the reserved word "#"), will match any single node in the input tree 54.

The terminal wildcard node (represented by "?" in the preferred embodiment), will match any single terminal node.

The non-terminal wildcard node (represented by "_" in the preferred embodiment), will match any single non-terminal node.

The range wildcard node (represented by " . . . " in the preferred embodiment), will match any series of nodes which are all consecutive children of the same parent.

Both the normal nodes and the special wild card nodes can exist in any position, with one exception. The range wildcard, " . . . ", should only be used as the last child of its parent node. This implies that the range wildcard node may never be the root node of a tree, but that it can be the only child of some node. This restriction exists for efficiency reasons. If it were allowed to have siblings on its left and on its right then determining which nodes the range wildcard matched with would be a generalized parsing problem. It would among other things introduce ambiguity into the matching process. (i.e. an input tree 54 and a pattern tree 92 might have more than one set of valid bindings).

For example with an input tree of:
Bold( "bold", ObjNP( "this", Noun( "line" )))
and the pattern tree of
Bold ( ?, _( . . . ))

The matching starts by comparing Bold in the pattern tree 92 against Bold in the input tree 54. Since the nodes are identical, they match and the next step is to match their children. Taking the first child of the pattern tree Bold node, ?, the next step is to try to match that against "bold" in the input tree. Since "bold" is a terminal node it matches ?. Since ? has no children, next go to its 'sister' node, _.

Therefore, compare _ against ObjNP, since ObjNP is non-terminal, they match. The node _ has a child node, so go on to match it. It matches both "this" and Noun. Since each node in the pattern tree is matched against nodes in the input tree the two trees have matched. Note that is this example, in the input tree the node "line" did not get bound to any node in the pattern tree. The final bindings are:

| Pattern: | Input |
|---|---|
| Bold | Bold |
| ? | "bold" |
| _ | ObjNP |
| . . . | "this", Noun |

All of the rewrite rules in a phase 80 are in a given order which is determined by the order of the rules in the input rewrite rule file 68. The last rule of any phase is #→#. If this rule does not exist explicitly in the input rule set as the last rule of each phase, it is added automatically. This rule is therefore implicit to each rewrite phase 80. If none of the rules in a given phase 80 match the input tree 54, the implicit rule #→, # will match, thereby guaranteeing the that process will recurse down the input tree 54.

Once the matching and binding of pattern tree 92 nodes to input tree 54 nodes is established, the input tree 54 can be rewritten, step 148. Just as matching binds input nodes to pattern trees, there are bindings 96 between pattern trees 92 and rewrite trees 94. These bindings are determined at load time by matching the pattern tree 92 and rewrite trees 94 in a similar way. The main difference is that when bindings between pattern and rewrite trees 92, 94 are determined, it is not required that all the nodes in either tree are bound. This is in contrast to matching input trees 54 and pattern trees 92, where all the pattern tree 92 nodes must be bound. For example in the rule:

SpellCheck( _, SelectionNP )→SpellCheck( _, "spelling" )

The tree on the left side of the arrow is the pattern tree 92. The tree on the right is the rewrite tree 94. The bindings are:

| pattern | rewrite |
|---|---|
| Spellcheck | Spellcheck |
| _ | _ |

SelectionNP in the pattern tree 92, and "spelling" in the rewrite tree 94 are both unbound.

The rewrite tree 94 may also be null. This is represented by a tree with a single root node *. When the rewrite tree 94 is null, no nodes are bound.

It is possible for several nodes in either the pattern or rewrite tree that have the same name. They are kept distinct by assigning subscripts to them:
Command( Bold/1 ( # ), Bold/2( # ))→Command( Bold/2 )

Once an input tree 54 has been matched against pattern tree 92, there are two sets of bindings. One set that maps nodes in the rewrite tree to nodes in the pattern tree 92, and one set that maps every node in the pattern tree 92 to nodes in the input tree 54.

The output tree is constructed by recursively examining each node in the rewrite tree. If the rewrite node is unbound, or if the rewrite node has any child nodes it is simply copied to the output tree. If the rewrite node is bound to a node in the pattern tree, then it is necessarily bound to a node in the input tree. If this input tree node is not the root node of the input tree, then the subtree of the input tree defined by this node is rewritten by recursion in the current phase. If the bound node in the input tree is the root node, then the root node is copied to the output tree, and all the subtrees defined by the children of the root node are rewritten, if there are any.

If the rewrite tree 94 is null (*), then the output tree will simply be null, that is the input is simply erased. Otherwise, when a node (or nodes) is copied to the output tree, it is placed in a position that corresponds to the position it was in the rewrite tree 94. So if the rewrite node under consideration is the root node, then the node copied to the output tree will be the root node of the output tree. If it is leftmost child of the root node, then the thing copied over will be the leftmost child of the root node.

The same tree or subtree from the input tree 54 may be represented many times in the rewrite tree 94. In this way it is possible for this section of the input to be duplicated in the output. If a section in the input is not bound at all then this section will not be copied to the output. In this way sections of the input tree may be deleted.

The root node of the input tree is never rewritten when it is copied to the output. This may put limits on the theoretical computing power of the system, but it also guarantees that for any set of rewrite rules and any input tree 54, the rewriting process will always terminate. It is impossible for this system to get stuck in an infinite loop. Each recursive rewrite call will always use a smaller section of the input tree than previous calls. Since all trees have a finite number of nodes, the number of recursive subcalls is always finite. There is no need to test against infinite recursion by any technique such as counting or cycle detecting.

As previously discussed, if an input tree does not match any rule in a given phase, it will match against the implicit rule
→#. This rule will match any input tree rooted with a non-terminal. The effect of this is to copy the root node matched by #, and rewrite each of the children.

Figure 7:
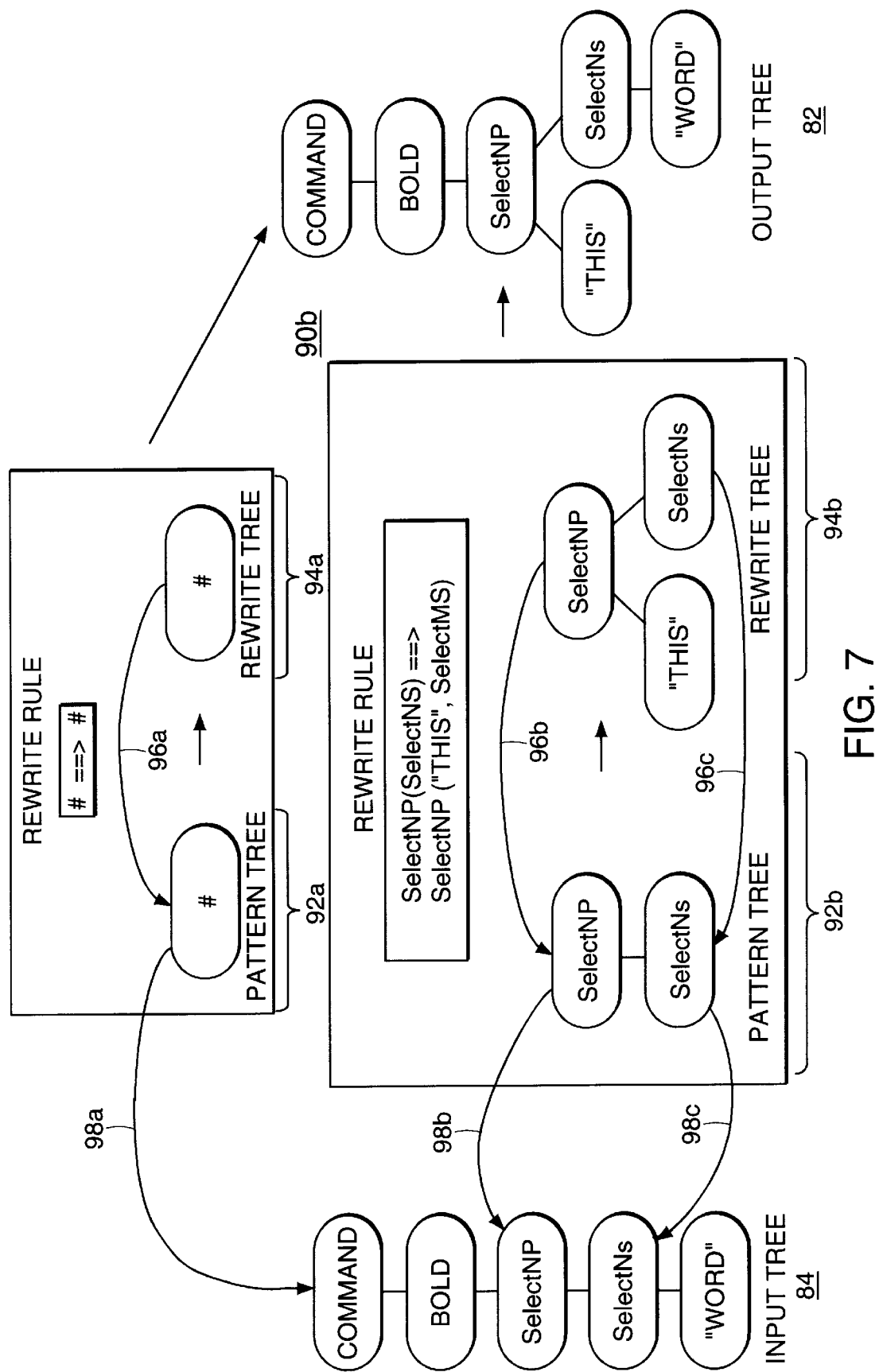
FIG. 7 shows how rewrite rules are matched to nodes of a parse tree.

Another example of this rewriting process is shown in FIG. 7. The example rewrite rules are listed in Appendix A, under Phase 2. The top node (in this case, the root node COMMAND), of the input tree 54 is matched against each rewrite rule, in order. The only rule that matches the COMMAND node is the implicit rewrite rule #→#, 90a. Therefore, the pattern tree 92a is bound 98a to the COMMAND node of input tree 54.

The rewrite tree 94b of rewrite rule 90a is written to output tree 82, by following the bindings 96a and 98a. Therefore the COMMAND node of input tree 54 is copied to output tree 82.

Since the COMMAND node of input tree 54 has subnodes, the rewrite rules are applied to the subnodes. Here, no rewrite rule other than #→# matches the BOLD node, so it is rewritten to the output tree 82 the same way as the COMMAND node (not shown).

Continuing down the subnodes, the SELECTNP node matches the first part of pattern tree 92b of the rewrite rule 90b SelectNP(SelectNS)→SelectNP ("this", SelectNS), and the matching process recurses to attempt to match the remainder of pattern tree 92b to input tree 54. Here, SELECTNS matches the subnode in the input tree 54, therefore the pattern tree 92b fully matches and the rewrite rule is applied. Bindings 98b, 98c match the nodes in the pattern tree 92b to the nodes in the input tree 54.

Next, the rewrite tree 94b is written to the output tree 82, by following the bindings 96 and 98. The node "this" in the rewrite tree 94b is not bound to any part of the pattern tree 92b, so it is copied directly to the output tree 82.

Finally, the rewrite rules are applied to final node "word" in input tree 54. Again, only the rewrite rule #→# matches, so the node is copied to the output tree 82 (not shown). Since there are no more nodes in the input tree 54, the rewrite phase is now complete.

Rewriting occurs in multiple phases 80. The output of one phase is cascaded to the next phase. This makes the system modular and extensible. In porting the present invention to a new application 32, only one or two end phases 80 directed towards code generation are changed. It also allows the possibility of making branched rewrite systems that produce two or more programs from a single command. Likewise, the modular nature allows multiple initial stages that support different sets of commands to produce the same programs (for example an English command set and a French command set).

A typical rewrite system includes approximately 20 phases. The format and syntax of the rewrite rules makes it easy for developers to understand the effects of unitary rules, despite the fact that rules can have very complicated effects, and can be called recursively.

Further, only a subset of the original input is used as input of a recursive subcall, even though recursive calls are allowed during a rewrite phase. This has the effect of guaranteeing that all computations will terminate. There is no need to check or ever worry about introducing sets of rewrite rules with infinite loops. This terminating condition does not interfere with the type of computation typically performed by the system.

The pattern matching ability of rewriter 66 is very powerful, allowing great flexibility in command interpretation. The matching algorithm guarantees that if two trees match, there is only one set of valid bindings. Without this property, a rewrite system might have more than one valid outcome for any given input.

The output command string 72 or program can be any sort of interpreted language or macro. It can be a series of keystrokes to send to an application, or even an actual binary program image. This output is then sent to an appropriate interpreter. In the preferred embodiment the output is Visual Basic code. A Visual Basic interpreter (or compiler) 74 either interprets complete Visual Basic programs, or the Visual Basic interpreter is used to simulate keystrokes being typed to the application 32. This technique is useful for applications 32 that have no exposed programming interface. Therefore, the present invention allows natural language control over any type of application 32 from any source. If the application 32 accepts keyboard input (or from a pointer interface including a mouse), then the present invention will work with it.

The interpreter 74 used for the preferred embodiment is any available interpreter, and can be easily changed depending on the requirements and configuration of the system. One example of an interpreter 74 is WinWrap from Polar Engineering. The interpreter 74 is embedded in the system, and programmed to create a Word.Basic OLE (Object Link Embedding) Automation object giving access to a running version of Microsoft Word through the VB function CreateObject, and stores the object in a global variable "WB". Any code produced with a "WB." header is a call to a Microsoft Word Basic function or command, which the VB interpreter causes Microsoft Word to execute. Therefore, the VB interpreter allows extra functionality to be programmed separate from the functionality (or lack thereof) in the end application.

This rewrite system of the present invention also allows immediate detection and control of errors. If, after rewriting any tree or subtree, the root node is __fail__, the rewriter 66 will abort immediately. Therefore no attempt is made to match any more rules in the current phase 80, nor does the output cascade to any later phases. The tree with the __fail__ root node returned by the current rewrite rule becomes the output for the whole rewrite system. Computation time is not wasted pursuing unacceptable input.

This allows the command interpreter 46 to process many more hypotheses (word phrases or sentences recognized by the recognizer) than the "correct" one, and efficiently reject bad hypotheses. In the preferred embodiment, CFG parser 52 is of a type that will reject a bad input word phrase or sentence as soon as it is theoretically possible to determine that the given word phrase or sentence cannot be parsed by CFG 60. Likewise in the preferred embodiment, rewriter 66 is programmed by rewrite rules to fail to rewrite parsed sentences that are problematic. For example, sentences with non-sensical or ill-defined containment (e.g "bold the next word in this character") are rejected. As soon as one of these sentences is detected, it is rejected without further processing. An informative error message is provided to the user. The message preferably is displayed on the monitor 22 in a "pop up" window or other means, allowing the user to understand the problem and correct it.

Similarly, in the preferred embodiment when the command interpreter 46 rejects an SRA 37 hypothesis, SRA 47 will return its next best recognition. This allows greatly improved performance by SRA 37 in recognition ability, due to detection and recovery from recognition errors.

Example of Command Processing Rewriting

An example of a complete rewriting of a parse tree according to the present invention will now be shown. The CFG rules and rewrite rules are listed in Appendix A. The phrase used is "bold this word", used in the context of a user requesting a word processing application 32 to change the appearance of a word in a document, the word being at the present insertion point of the word processing application. For this example, the word processing application 32 is Microsoft Word, running under Microsoft Windows (any version).

Given the input sentence: "bold this word", the parse tree generated by the parser is:

Command( Bold( BoldV( "bold" ),
    ObjectNP( SelectNP( Det( "this" ),
      SelectNs( "word" )))))

Figure 8:
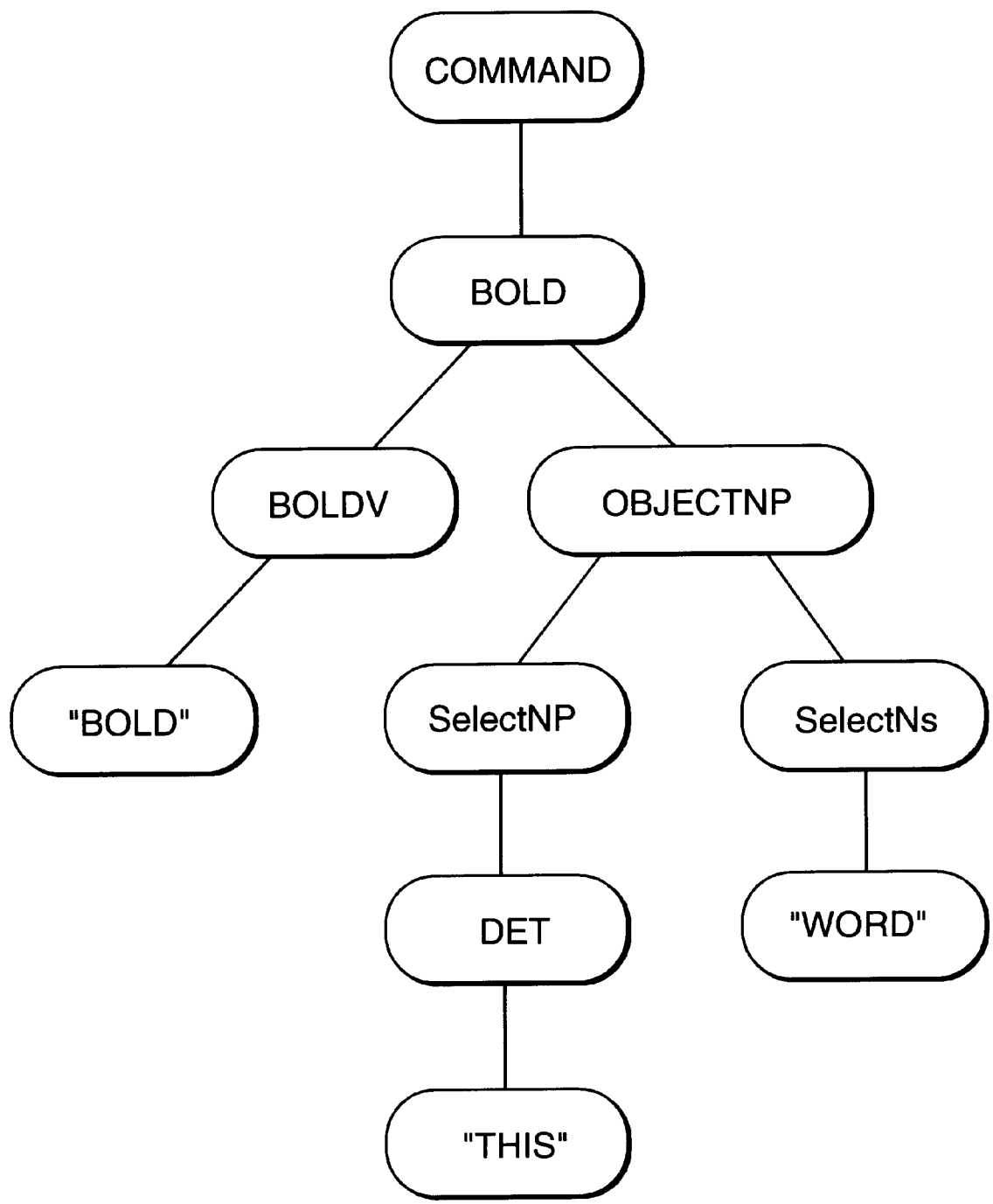
FIG. 8 is an example parse tree produced by a CFG parser for the phrase "bold this word"

A representation of this parse tree is shown in FIG. 8.

Phase 1 begins. The rewriter attempts to match the above tree against each rule. Since there are no rules that have pattern trees with a root of Command, __ or #, the default rule #→# is applied. It matches the above tree, and the rewriter starts rewriting the tree. Command is copied as the root node of the output. The rewriter then rewrites the subtrees defined by each of the children. There is only one such sub tree:

Bold( BoldV( "bold" ),
    ObjectNP( SelectNP( Det( "this" ),
      SelectNs("word"))))

Again it will match no rules in this phase. The rewriter applies the default rule and proceeds to children. In this case there are two child subtrees. The first is:

BoldV( "bold" )
This tree matches the rule:
BoldV→*

Figure 9:
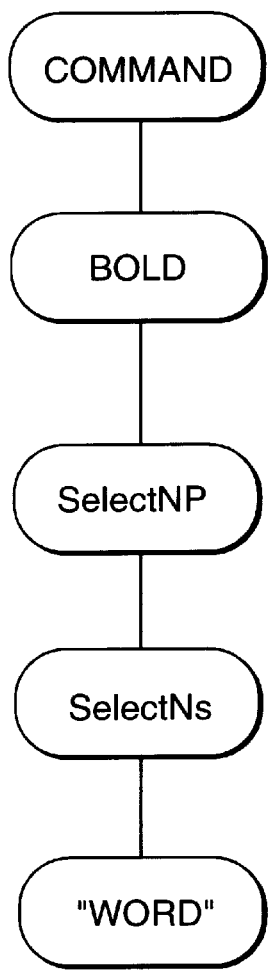
FIG. 9 is the example parse tree of FIG. 8 after completion of a first rewrite phase with example rewrite rules.

The output of this rule is null, and a null output is returned. The rewriter proceeds with the second child of Bold:

ObjectNP( SelectNP( Det( "this" ), SelectNs( "word" )))
In this case the following rule matches:
ObjectNP (SelectNP)→SelectNP This rule will cause several more recursive rewrite calls. The final output is:
SelectNP ( SelectNs ( "word" ))
This is copied to the output; and the final output of this phase is:
Command( Bold( SelectNP( SelectNs( "word" ))))
This is shown in FIG. 9. The effect of this phase has been to greatly simplify the input tree. Many nodes that were needed in the CFG but are not needed for the rewriter have been eliminated.

Figure 10:
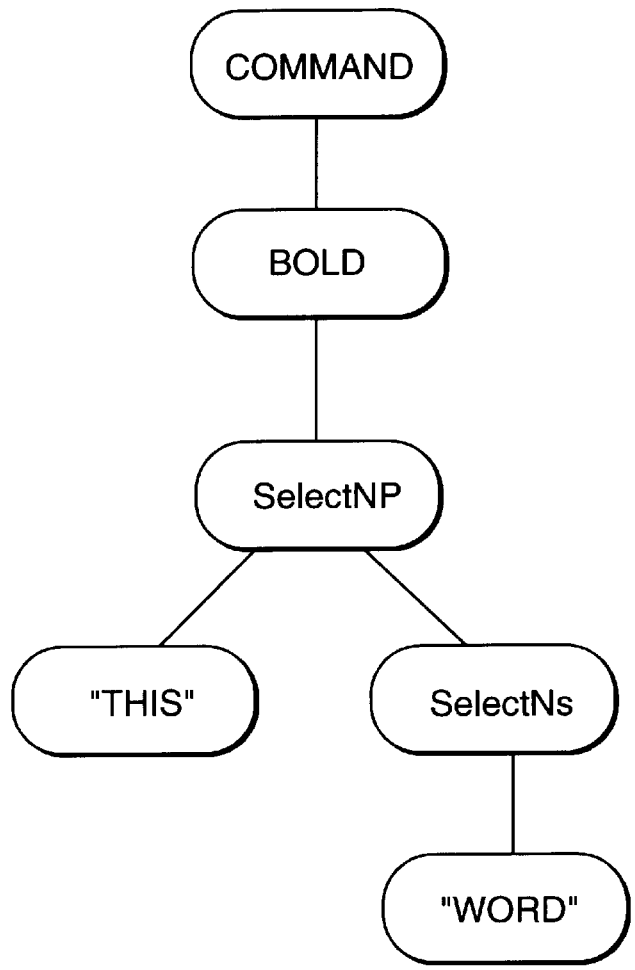
FIG. 10 is the rewritten tree of FIG. 9 after completion of a second rewrite phase with example rewrite rules.
Figure 11:
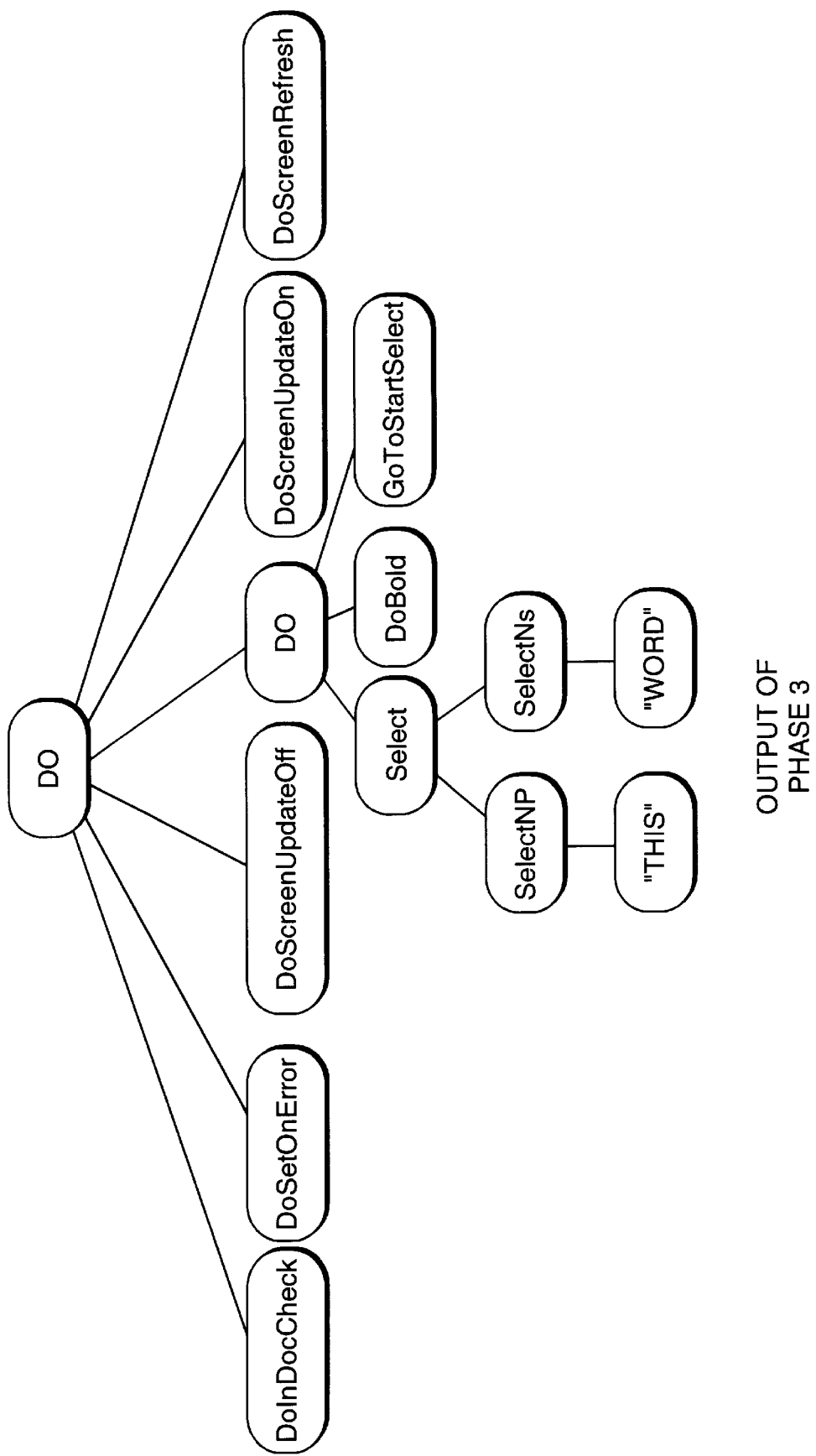
FIG. 11 is the rewritten tree of FIG. 10 after completion of a third rewrite phase with example rewrite rules.
Figure 12:
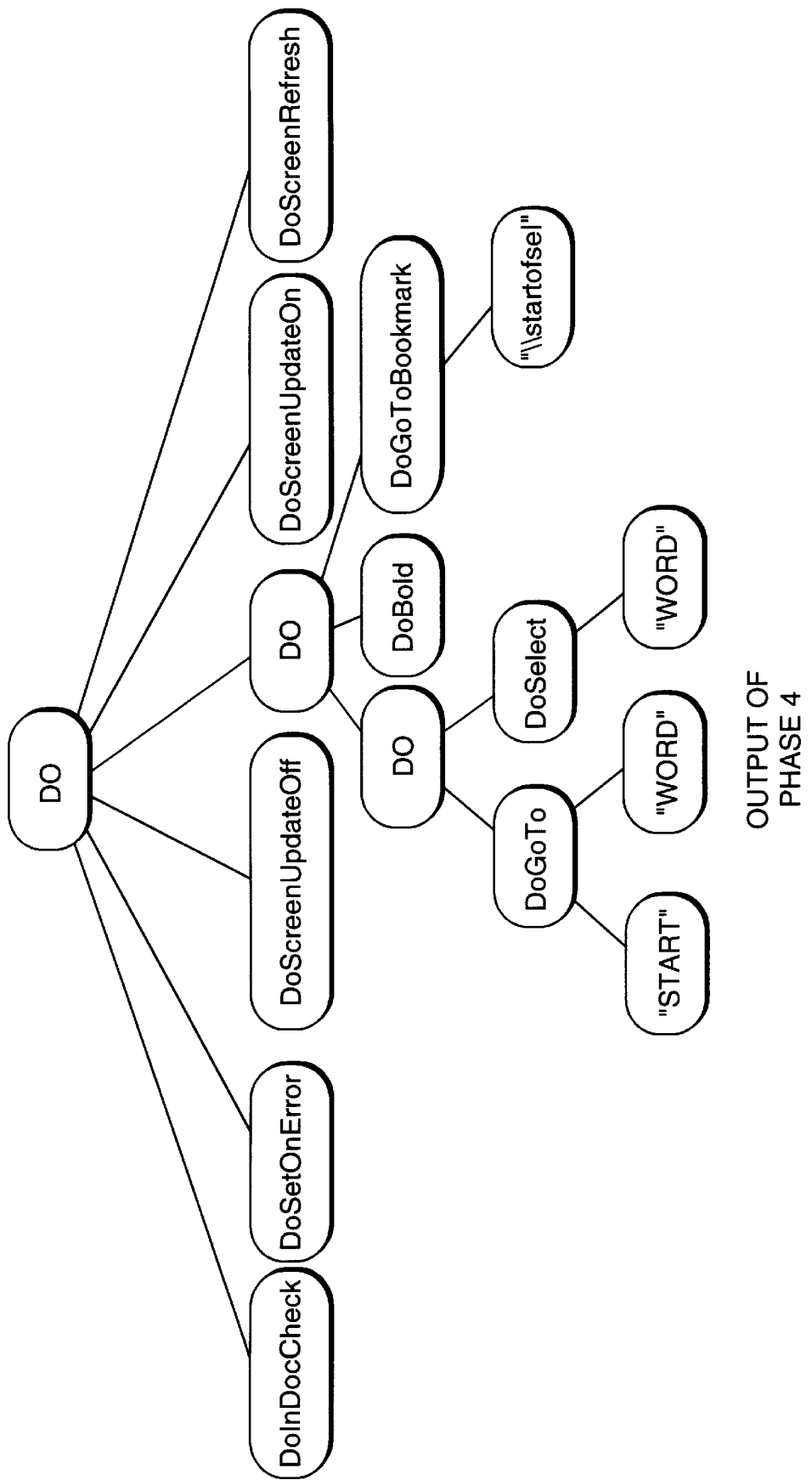
FIG. 12 is the rewritten tree of FIG. 11 after completion of a fourth rewrite phase with example rewrite rules.
Figure 13:
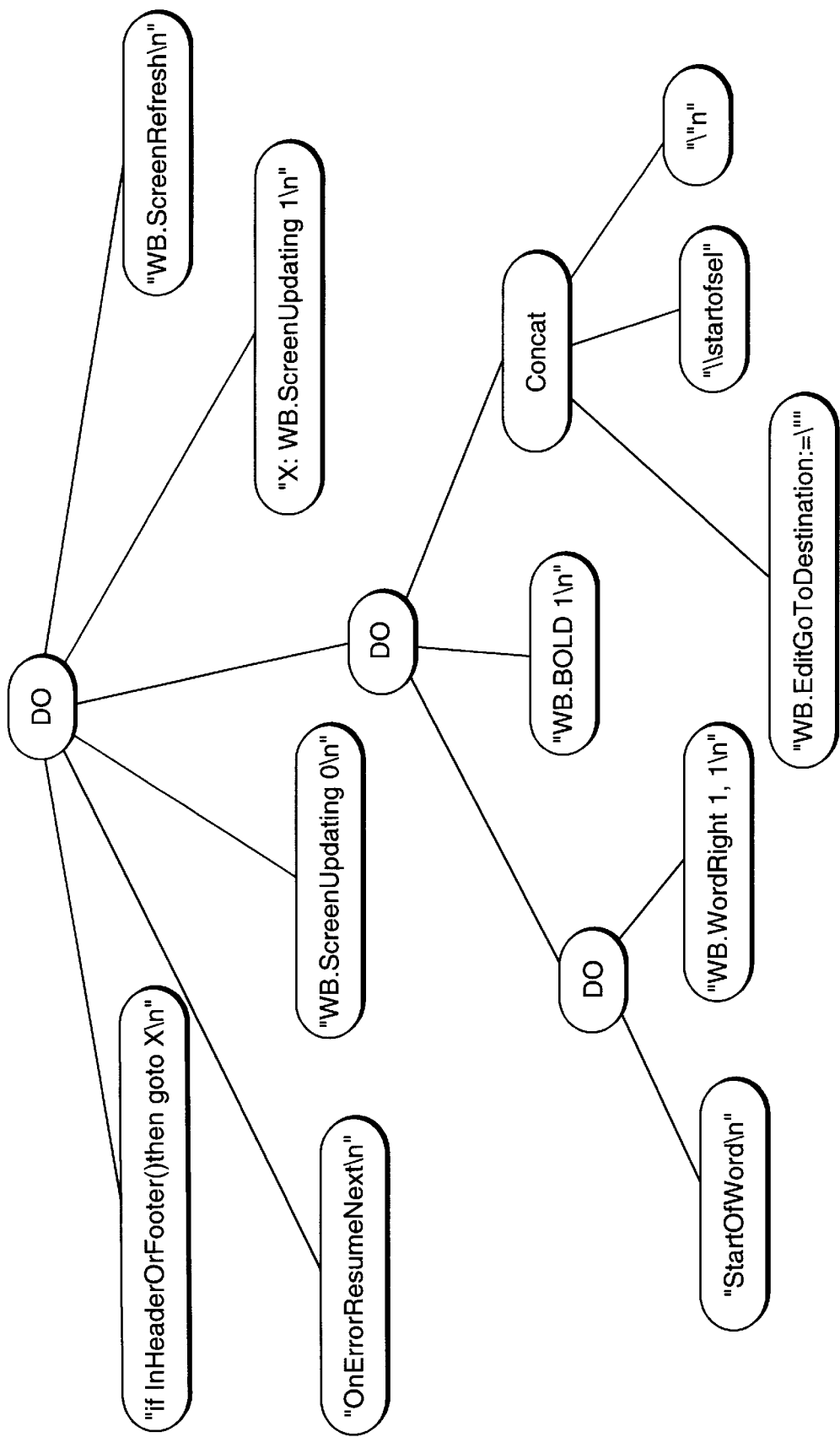
FIG. 13 is the rewritten tree of FIG. 12 after completion of a final rewrite phase with example rewrite rules.

The second rewrite phase begins. This phase has a single rule:
SelectNP (SelectNs)→SelectNP ("this", SelectNs)
The steps of matching and rewriting this tree were previously described in reference to FIG. 7. The effect of this rule to insert the word "this" into the input:
Command( Bold( SelectNP("this", SelectNs( "word" ))))
The resultant tree is shown in FIG. 10.
The result of phase 3, as shown in FIG. 11 is:
Do(DoInDocCheck, DoSetOnError, DoScreenUpdateOff,
   Do ( Select( SelectNP( "this" ), SelectNs( "word" ))
      DoBold, GoToStartSelect) DoScreenupdateon,
      DoScreenRefresh)
The result of phase 4, as shown in FIG. 12 is:
Do ( DoInDocCheck, DoSetOnError, DoScreenUpdateOff,
   Do (Do( DoGoTo( "start", "word" ), DoSelect( "word" )),
   DoBold, DoGoToBookmark( "\\startofsel" )) DoScreen-
     UpdateOn
     DoScreenRefresh )
The results of phase 5, as shown in FIG. 13 is:

```
Do(  "if InHeaderOrFooter() then goto X\n",
     "OnErrorResumeNext\n", "WB.Screenupdating 0\n",
     Do( Do( "Startofword\n", "WB.WordRight 1, 1\n"
     "WB.Bold 1\n", Concat ( "WB.EditGoTo Destination := \"",
            "\startofsel", "\"\n"))
     "X: WB.ScreenUpdating 1\n", "WB.ScreenRefresh\n" )
```

Figure 14:
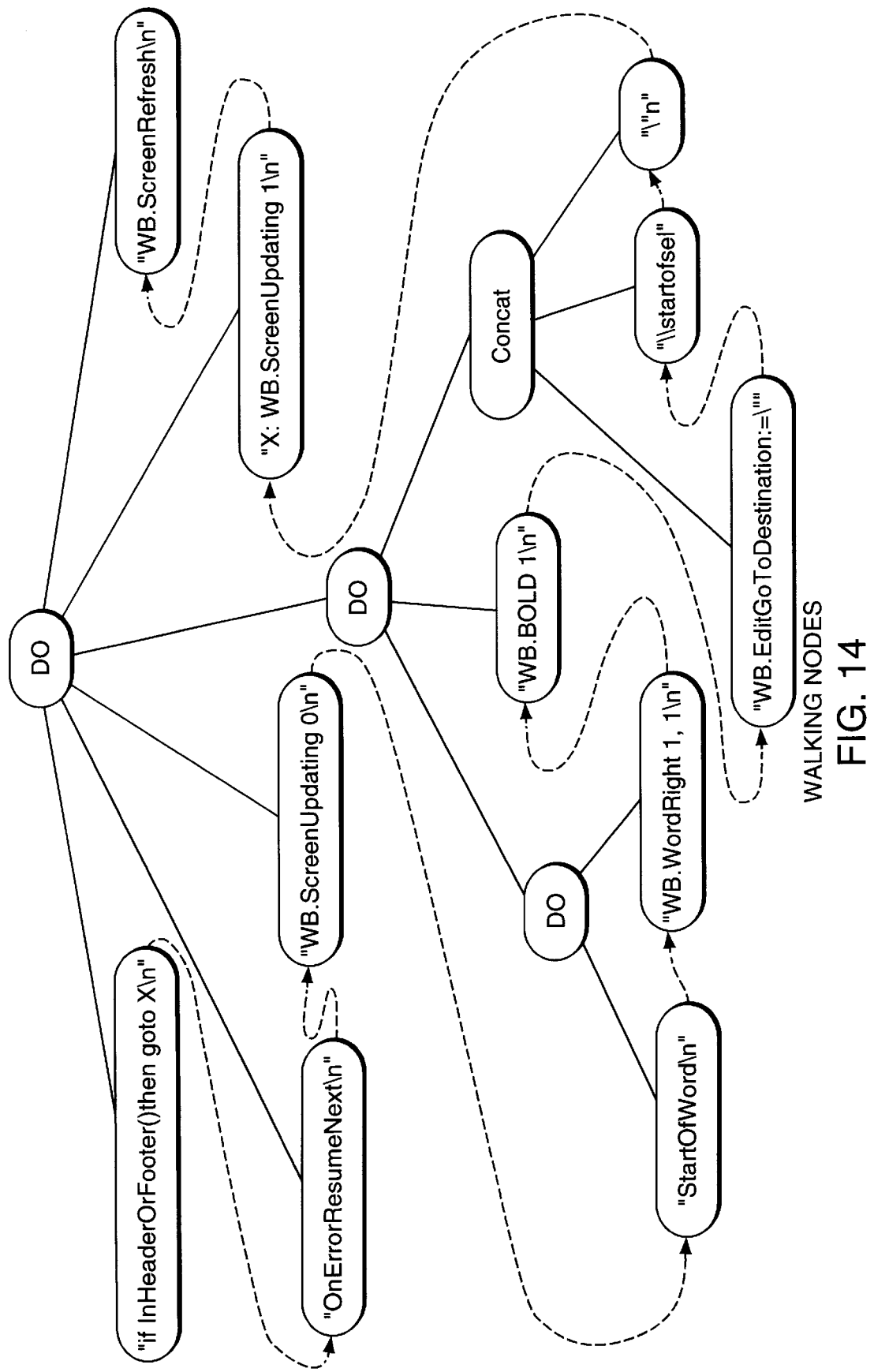
FIG. 14 shows how the nodes are traversed in the example rewrite tree of FIG. 13.
Figure 15:
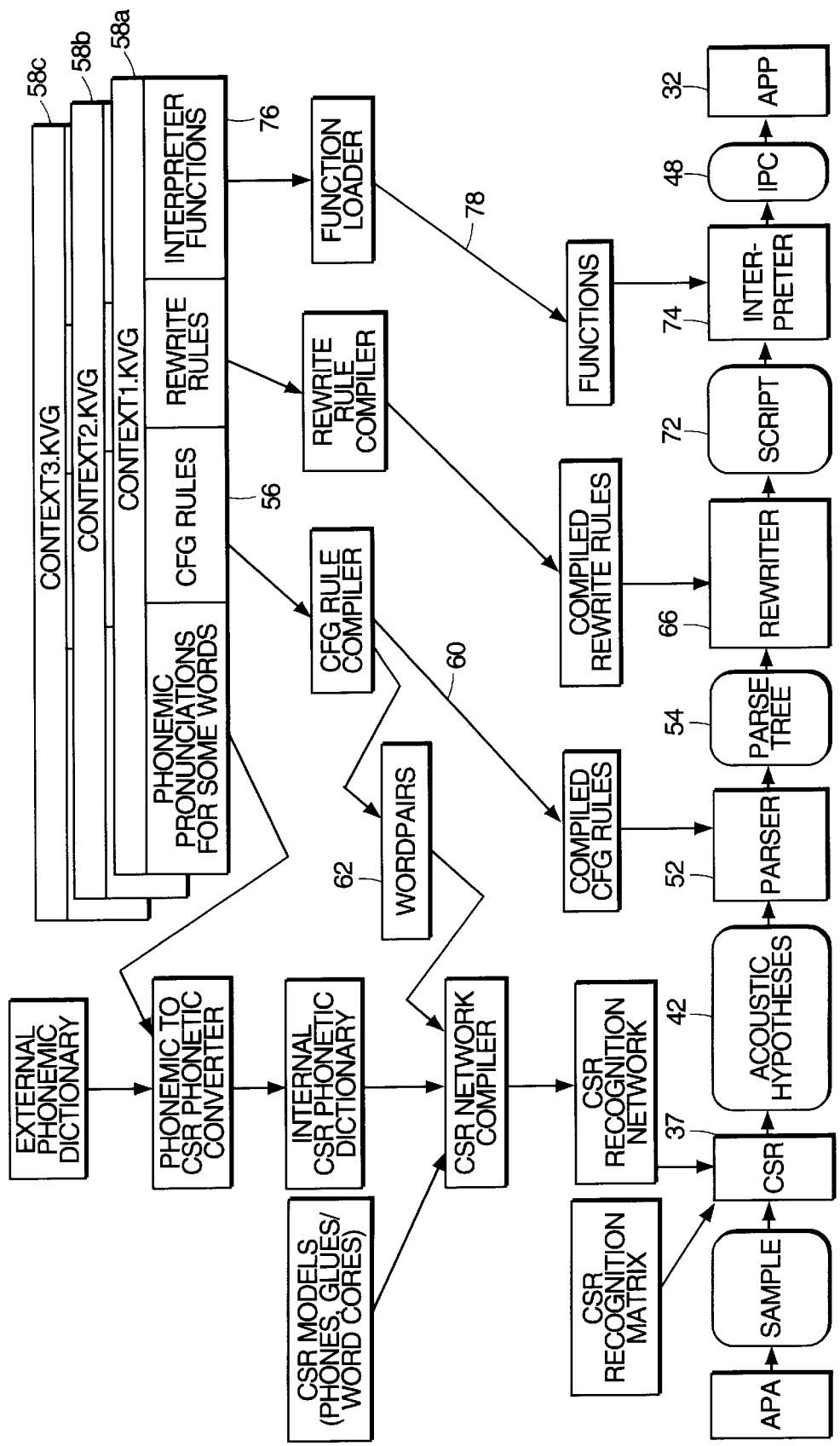
FIG. 15 is an overview of an application system according to one embodiment of the present invention.

This is the final output from the rewrite system. The terminal nodes are scanned (walked), as shown in FIG. 14, and their contents are concatenated to produce the following command string (script):
   if inHeaderorFooter( ) then goto X
   OnErrorResumeNext
   WB.ScreenUpdating 0
   StartOfWord
   WB.WordRight 1, 1
   WB.bold 1
   WB.EditGoTo Destination :="\startofsel"
   X: WB.Screenupdating 1
   WB.ScreenRefresh
This script is then executed by a VB (Visual Basic) Interpreter, which instructs Microsoft Word to bold the word. In this script, commands sent directly to Microsoft Word have the "WB." prefix. Other functions are implemented in VB, for example the StartOfWord command is implemented as:
sub startofword
   while not isstartofword ( )
     wb.charleft 1
   wend
endsub
This function instructs Microsoft Word to move the insertion point to the left one character, and checks to see if the insertion point is at the beginning of the word, looping until the condition is satisfied. The VB interface allows a powerful control interface to the end application, and also a level of abstraction among similar types of applications 32. For example, the VB interpreter is programmed for word processing applications with a set of functions to allow cursor movement, recognizing and manipulating elements such as words, paragraphs, sentences, tables, pages etc. A different set of applications would have a similar set of interface functions written for the interpreter.

A production system for controlling Microsoft Word is capable of interpreting and controlling commands in categories including:
Selection (Select, Extend, Unselect)
Navigation (GoTo, Page, Scroll)
Text Manipulation (Copy, Cut, Delete, Insert, Move, Paste)
Text Formatting (Align, Bold, ChangeColor, ChangeFont, HideText,
InitialCap, Italicize, Lowercase, Togglecase, Unbold, Underline,
UnhideText, Unitalicize, Ununderline, Uppercase)
Document Formatting (Columns, FilepageSetup, Tabs)
Paragraph Formatting (Borders, Bullet, Paragraph, Number, Unbullet, Unnumber)
Program (HideGU1, Turn, UnhideGU1, ViewGUI, ViewMode, Zoom)
Tables (TableAdd, TableColWidth, TableRowHeight, TableToText, TextToTable)
Document (CloseFile, OpenFile, Print, Protect, SaveFile, Unprotect)
Outline (Demote, OutlineCollapse, OutlineMove, ShowHeadingLevel)
Miscellaneous (Endnotes, Footnotes, TOC)
Tools (GrammarCheck, MailMerge, SpellCheck, WordCount)
Undo (Redo, Undo)
Testing (ShowVersion)
A rewrite system for interpreting the above command categories include 14 separate passes. The rewrite passes are directed towards:
Pass 1: Drop unneeded terms, convert nonterminals.
Pass 2–3: Synonyms and paraphrasing, and regularizing tree structure.
Pass 4: Paraphrasing.
Pass 5: Detecting Semantic Errors.
Pass 6: Detecting Containment Errors.
Pass 7: Command blocks for checking status of document.
Pass 8–13: Command processing.
Pass 14: Code Generation.

Another feature of the rewrite system is that self-checking of rewrite rules is easily performed by a user writing rewrite rules. A rewrite system is composed of one or more passes consisting of one or more rewrite rules. During each pass, the input tree or subtree is matched against the various input patterns in order, and a rule match causes that output pattern to be written. However, if there is an error in an input or output pattern in that pass, or any earlier pass, either an incorrect rewrite tree will be passed as input, or the correct rule will fail to fire, and in incorrect tree will be passed through the system. There is nothing in the rewrite system itself to detect that the output tree is invalid.

To automatically detect such an error, the rewrite system is augmented by an additional rewrite pass whose sole purpose is to detect errors. The pass consists of a list of rewrite rules whose input and output patterns are the names of expected nonterminals, followed by a rule that matches any nonterminal and rewrites to a fail node with an error message.

For example, the last rewrite pass looks like:
[rewrite]
Do→Do
Concat→Concat
__→fail ("internal rewrite error")

If any nonterminal node other than Do or Concat is present in the final output tree, the last rule will fire, and report an error to the rewrite system. The user can then examine the final output tree, and quickly determine which rewrite rule produced the faulty rewrite tree, and correct that rewrite rule.

As various changes could be made in the above constructions without departing from the scope of the invention, it should be understood that all matter contained in the above description or shown in the accompanying drawings shall be interpreted as illustrative and not in a limiting sense.

---

Appendix A

Example CFG Grammar and Rewrite Rules
In the following CFG, symbols enclosed in curly braces are optional. Symbols separated by vertical bars are alternates.
Pronoun represents 3 rules: NP --> "block", NP --> Det "block", NP --> Pronoun)
Command --> Bold | Select
Bold -> BoldV ObjectNP
BoldV --> "bold"
Select --> SelectV SelectNP
SelectV --> "select" "highlight" "choose"
ObjectNP --> SelectionNP SelectNP
SelectionNP --> {Det} "selection" Pronoun
SelectNP --> {Det} SelectNs | {The} Next SelectNs
SelectNs --> "character"| "word" | "sentence"
Next --> "next" "previous" "following" "preceding"
Pronoun --> "it" "that" "this" "them" "those" "these"
Det --> "the" "this" "that"
The --> "the"
The following Rewrite system has five phases:
//****************************************************
// phase 1: drop unneeded terms
//****************************************************
BoldV ==> *
Selectv ==> *
Det ==> *
Pronoun ==> *
The ==> *
objectNP (SelectionNP) ==> SelectionNP
ObjectNP (SelectNP) ===> SelectNP
Next ("following") ==> Next ("next")
Next ("preceding") ==> Next ("previous")
//****************************************************
// phase 2: first phase of command processing
//****************************************************
SelectNP (SelectNs) ==> SelectNP ("this", SelectNs)
//****************************************************
// phase 3. first phase of command processing
//****************************************************
Command (_) ==>
    Do (DoInDocCheck, DoSetOnError, DoScreenupdateoff,
        DoScreenUpdateOn, DoScreenrefresh)
Bold (SelectionNp) ==> DoBold
Bold (SelectNP) =>
        Do (Select (SelectNP), DoBold, GoToStartSelect)
//****************************************************
// phase 4: second phase of command processing
//****************************************************
Select (SelectNP ("this", SelectNs (#/2))) ==>
    Do (DOGOTO ("start", #/2), DoSelect (#/2))
Select (SelectNP (Next ("next"), SelectNs (#/2))) ==>
    Do (DoAdjNext (#12), DoSelect (#/2))
Select (SelectNP (Next ("previous"), SelectNs(#/2))) ==>
        Do (DoAdjprev (*/2), DoGoTo ("previous", #/2), DoSelect
(#
GoToStartSelect ===> DoGoToBookmark ("\\startotsel")
//****************************************************

-continued

Appendix A

// phase 5: codegen
//****************************************************
DoSetOnError ==> "On Error Resume Next\n"
DoAppActivate ==> "AppActivate \"microsoft word\"\n"
DoScreenupdateoff ==> "WB.ScreenUpdating 0\n"
DoScreenupdateOn ==> "X: WB.ScreenUpdating 1\n"
DoScreenRetresh ==> "WB.ScreenRefresh\n"
DoInDocCheck ==> "if InHeaderorFooter ( ) then goto X\n"
DoAdjNext ("character") ==> *
DoAdj Next ("word") ==> "AdjNextword\n"
DoAdjNext ("sentence") ==> "AdjNextSent\n"
DoAdjprev ("character") ==> *
DoAdjPrev ("word") ==> "AdjPrevword\n"
DoAdjPrev ("sentence") ==> "AdjPrevSent\n"
DoGoTo ("start", "character") ==> *
DoGoTo ("start", "word") ==> "Startofword\n"
DoGoTo ("start", "sentence") ==> "StartofSent\n"
DoGoTo ("previous", "character") ==> "PrevChar 1\n"
DoGotTo ("previous", "word") ===> "PrevWord 1\n"
DoGoTo ("previous", "sentence") ==> "PrevSent 1\n"
DoGoToBookmark (#) ==> Concat ("WB.EditGoTo Destination := \"")
DoSelectionon ==> "WB.ExtendSelection\n"
Doselectionoff ==> "WB.Cancel\n"
DoBold ==> "WB.Bold 1\n"
DoSelect ("character") ==> "WB.CharRight 1, 1\n"
DoSelect ("word") ==> "WB.WordRight 1, 1\n"
DoSelect ("sentence") ==> "WB.SentRight 1, 1\n"
Do ==> Do
Concat ==> Concat
__ ==> fail ("rewrite error")
//****************************************************
// End Rewrite Rules
//****************************************************

What is claimed is:

1. An enhanced speech recognition system having dictation capability and the capability of converting an unprompted user-generated word phrase into a command string for causing a computer application to perform actions as directed by said word phrase comprising:
   a speech recognition engine providing a dictation output and candidate word phrases to a second output;
   a command interpreter, coupled to the second output, the command interpreter having:
   (i) a parser for completely parsing a candidate word phrase into a parse tree;
   (ii) a plurality of predefined rewrite rules divided and grouped into a plurality of phases; and
   (iii) a rewriting component, for applying at least one of said predefined rewrite rules to said parse tree, for rewriting said parse tree according to said at least one predefined rewrite rule so as to produce said command string, wherein all predefined rewrite rules grouped into one of said plurality of phases are applied to said parse tree before applying predefined rewrite rules grouped into another of said plurality of phases to said parse tree.

2. The system of claim 1, wherein said plurality of predefined rewrite rule grouped into each of said phases are applied in a predefined sequence to said parse tree.

3. The system of claim 1 wherein each of said predefined rewrite rules includes a pattern matching portion and a rewriting portion.

4. The system of claim 3 wherein said rewriting component applies at least one predefined rewrite rule to said parse tree by comparing said predefined rewrite rule pattern matching portion to at least a part of said parse tree.

5. The system of claim 4 wherein if said predefined rewrite rule pattern matching portion matches at least a part of said parse tree, said matched part of said parse tree is rewritten according to said predefined rewrite rule rewriting portion.

6. If The system of claim 1 wherein said parser includes a predefined CFG (Context Free Grammar) comprising a plurality of rules, and said CFG parser applies at least one of said rules to said word phrase, to produce said parse tree.

7. The system of claim 6, wherein said CFG parser includes a predefined CFG (Context Free Grammar) comprising a plurality of rules, and said CFG parser applies at least one of said rules to said word phrase to produce said parse tree.

8. The system of claim 1 wherein said command string includes programming language instructions.

9. The system of claim 8 wherein said programming language instructions are interpreted by an interpreting application which causes said computer application to perform actions as directed by said word phrase.

10. The system of claim 8 wherein said programming language instructions are interpreted by computer application to cause said computer application to perform actions as directed by said word phrase.

11. The system of claim 1 wherein said computer application is a word processing application.

12. A method of an enhanced speech recognition system for interpreting an unprompted user-generated word phrase and directing a computer application to perform actions according to said word phrase, comprising the steps of:

providing a first output having recognized dictated text, and a separate second output having a plurality of candidate word phrases, the first and second outputs being mutually exclusive;

parsing said word phrase from the candidate word phrase output into a complete parse tree representing said candidate word phrase;

applying a plurality of predefined rewrite rules to said parse tree, for rewriting said parse tree into at least one modified parse tree, the plurality of predefined rewrite rules being divided and grouped into a plurality of phases each of said plurality of predefined rewrite rules including a pattern matching portion, for comparison to and matching at least a part of said parse tree, and also including a rewriting portion, for rewriting a matched part of said parse tree, each of the predefined rewrite rules grouped in one of the plurality of phases being applied before applying predefined rewrite rules grouped into another of the plurality of phases;

producing a command string by traversing nodes of said at least one modified parse tree; and providing said command string to said computer application.

13. The method of claim 12, wherein said step of applying a plurality of predefined rewrite rules to said parse tree includes:

comparing said predefined rewrite rule pattern matching portion to at least a part of said parse tree.

14. The method of claim 13 wherein said step of comparing said predefined rewrite rule pattern matching portion to at least a part of said parse tree further includes the step of:

if said predefined rewrite rule pattern matching portion matches said at least a part of said parse tree, rewriting said matched part of said parse tree according to said predefined rewrite rule rewriting portion.

15. The method of claim 14 further including the step of:

if said matched part of said parse tree includes subnodes not matched by said predefined rewrite rule pattern matching portion, sequentially applying said predefined rewrite rules grouped in one of said plurality of phases to said unmatched subnodes of said parse tree.

16. The method of claim 14 wherein each of said phases includes an implicit predefined rewrite rule which matches and rewrites one node of said parse tree, said implicit predefined rewrite rule being applied to said parse tree if no other predefined rewrite rules grouped in each of said phases match said parse tree.

17. The method of claim 12 wherein said step of providing said command string to said computer application includes the step of:

providing said command string to an interpreting application, said interpreting application executing said command string and causing said computer application to perform actions.

18. The method of claim 12 wherein said command string is a set of instructions for causing said computer application to perform actions.

19. The method of claim 12 wherein said command string is a compiled program for causing said computer application to perform actions.

20. The method of claim 12, wherein said applying a plurality of predefined rewrite rules to said parse tree representing a candidate word phrase includes rejecting said parse tree, and proceeding to a next parse tree representing a next candidate word phrase.

21. The method of claim 12 wherein said parsing said word phrase into a parse tree representing said word phrase includes:

parsing said word phrase with a Context Free Grammar (CFG) parser applying a plurality of CFG parsing rules to said word phrase.

22. The method of claim 12 wherein said computer application is a word processing application.

23. A method of an enhanced speech recognition system for allowing a user to control a computer application with spoken commands, comprising the steps of:

converting an unprompted user-generated word phrase into electrical signals representing said word phrase;

processing said electrical signals, with a Speech Recognition application that produces a first output having recognized dictated text, and a separate second output having a plurality of candidate word phrases, the first and second outputs being mutually exclusive;

parsing at least one candidate word phrase with a Context Free Grammar (CFG) parser, into a complete parse tree;

applying a plurality of predefined rewrite rules grouped into a plurality of phases to said parse tree, for rewriting said parse tree into at least one modified parse tree, each of said plurality of predefined rewrite rules including a pattern matching portion, for matching at least a part of said parse tree, and also including a rewriting portion, for rewriting said matched part of said parse tree, the predefined rewrite rules grouped in one of the plurality of phases being applied before applying predefined rewrite rules in another of the plurality of phases;

producing a command string by traversing nodes of said at least one modified parse tree;

providing said command string to an interpreter application; and directing said interpreter application to execute said command string, for causing said interpreter application to instruct said computer application to perform actions appropriate for said spoken command.

* * * * *

UNITED STATES PATENT AND TRADEMARK OFFICE
CERTIFICATE OF CORRECTION

PATENT NO. : 6,138,098
DATED : October 24, 2000
INVENTOR(S) : Shieber et al.

It is certified that error appears in the above-identified patent and that said Letters Patent are hereby corrected as shown below:

Cover Sheet of Patent, [73] Assignee section: Please delete "Ypres, Belgium" and insert -- Ieper, Belgium --. A copy of the recordation of assignment document is enclosed.

Column 17, Claim 6, Line 1: Delete the word "If" from the beginning of the sentence.

Signed and Sealed this

Eighth Day of May, 2001

Attest:

NICHOLAS P. GODICI

Attesting Officer

Acting Director of the United States Patent and Trademark Office